United States Patent [19]
Muramatsu et al.

[11] Patent Number: 4,884,468
[45] Date of Patent: Dec. 5, 1989

[54] CONTROL CABLE CONNECTING DEVICE

[75] Inventors: Tadao Muramatsu; Shigeru Hoshino, both of Toyota; Kenichi Suzuki, Nagoya; Shinichi Yamamuro, Toyoake, all of Japan

[73] Assignees: Toyota Jidosha Kabushiki Kaisha; Chuo Hatsujo Kabushiki Kaisha, both of Aichi, Japan

[21] Appl. No.: 311,958

[22] Filed: Feb. 17, 1989

[30] Foreign Application Priority Data

Feb. 18, 1988 [JP] Japan .................. 62-20334[U]

[51] Int. Cl.$^4$ .................................................. E16C 1/10
[52] U.S. Cl. ..................................... 74/502.4; 74/502.6; 74/501.5 R; 74/500.5; 403/16
[58] Field of Search ............... 74/502.4, 502.6, 500.5, 74/502, 503, 504, 505, 512, 501.5 R, 501.6, 513, 470; 403/316; 192/111 A

[56] References Cited

U.S. PATENT DOCUMENTS

| | | | |
|---|---|---|---|
| 3,276,799 | 10/1966 | Moore et al. | 403/316 |
| 3,675,731 | 7/1972 | Stopera | 74/513 |
| 3,995,512 | 12/1976 | Johnsen | 74/502.4 |
| 4,023,435 | 5/1977 | La Due | 74/502.4 |
| 4,635,498 | 1/1987 | Zimmermann et al. | 74/501.5 R |
| 4,643,042 | 2/1987 | Swoveland | 74/501.5 R |
| 4,790,206 | 12/1988 | Thomas | 74/500.5 X |
| 4,798,098 | 1/1989 | Keller et al. | 74/470 |
| 4,802,378 | 2/1989 | Memmola | 74/502.6 |
| 4,805,479 | 2/1989 | Brighwell | 74/502.4 |
| 4,811,621 | 3/1989 | Spease | 74/502.4 X |

FOREIGN PATENT DOCUMENTS

| | | | |
|---|---|---|---|
| 2852451 | 6/1980 | Fed. Rep. of Germany | 74/502.4 |
| 3428919 | 2/1986 | Fed. Rep. of Germany | 74/502.4 |
| 0205008 | 10/1985 | Japan | 74/502.4 |

*Primary Examiner*—Vinh Luong
*Attorney, Agent, or Firm*—Oblon, Spivak, McClelland, Maier & Neustadt

[57] ABSTRACT

A control cable connecting device for connecting the cable of a control cable to an operated device. The control cable connecting device comprises a guide sleeve, an operating member slidably fitted in the guide sleeve, supporting lugs fixed to the outer surface of the guide sleeve with a predetermined space therebetween, a guide block fixedly connected to the extremity of the outer casing of a control cable, a driving member slidably fitted in the guide block and fixed to the free end of the cable of the control cable, and a clip for fastening the guide block to the supporting lugs. The driving member can be connected operatively to the operating member simply by placing the guide block containing the driving member in the space between the supporting lugs, and simply by fastening the guide block to the supporting lugs with the clip. Thus, the control cable connecting device requires a small space for installation and is capable of being assembled easily.

2 Claims, 3 Drawing Sheets

CONTROL CABLE CONNECTING DEVICE

BACKGROUND OF THE INVENTION

1. Field of the Invention

The present invention relates to a control cable connecting device for connecting a driving member connected to the free end of the cable of a control cable to an operating member slidably fitted in a guide sleeve to drive the operating member slidably along the guide surface of the guide sleeve.

2. Description of the Prior Art

In a conventional control cable connecting device of this kind, a first guide member is attached to the outer surface of a second guide member for slidably guiding an operating member, a driving member for driving the operating member is slidably fitted in the first guide member, the driving member is connected through a groove formed in the second guide member to the operating member, a control cable attachment connected to the free end of the outer casing of a control cable is attached to a supporting plate disposed apart from the first guide member, and a connecting member fixed to the extremity of the cable of the control cable projecting from the control cable attachment is connected to the driving member. Accordingly, in interconnecting the control cable and the operating member, two separate steps of work are required for attaching the control cable attachment to the supporting plate and for connecting the connecting member fixed to the extremity of the cable to the driving member. Furthermore, since the control cable attachment is attached to the supporting plate disposed apart from the first guide member for guiding the driving member and the extremity of the cable is extended from the control cable attachment to the driving member, the conventional control cable connecting device requires a comparatively large space for installation.

SUMMARY OF THE INVENTION

Accordingly, it is an object of the present invention to provide a control cable connecting device capable of simultaneously connecting the extremity of the cable of a control cable and the extremity of the outer casing of the control cable to a device including an operating member which is to be driven by the control cable.

It is another object of the present invention to provide a control cable connecting device requiring a reduced space for installation.

To achieve the objects of the invention, the present invention provides a control cable connecting device comprising a guide block connected to the extremity of the outer casing of a control cable; a driving member connected to the extremity of the cable of the control cable projecting from the extremity of the outer casing and slidably fitted in the guide block, supporting lugs attached to the outer surface of a guide sleeve for slidably guiding an operating member, to hold the guide block therebetween so that the driving member is connected through a slot formed in the wall of the guide sleeve to the operating member; and a clip for holding the guide block in place between the supporting lugs.

In operatively connecting the driving member fixed to the extremity of the cable of the control cable to the operating member slidably guided by the guide sleeve, the control cable, the driving member and the guide block are assembled beforehand, and then the assembly of the control cable, the driving member and the guide block is mounted simply on the guide sleeve by stopping the guide block in place between the supporting lugs with a clip. Thus, both the cable of the control cable and the guide block holding the extremity of the outer casing of the control cable can be connected simultaneously to the corresponding members of a controlled device, and the control cable connecting device can be installed in a reduced space.

BRIEF DESCRIPTION OF THE DRAWINGS

The above and other objects, features and advantages of the present invention will become more apparent from the following description taken in conjunction with the accompanying drawings, in which.

DETAILED DESCRIPTION OF THE PREFERRED EMBODIMENT

Figure 1:
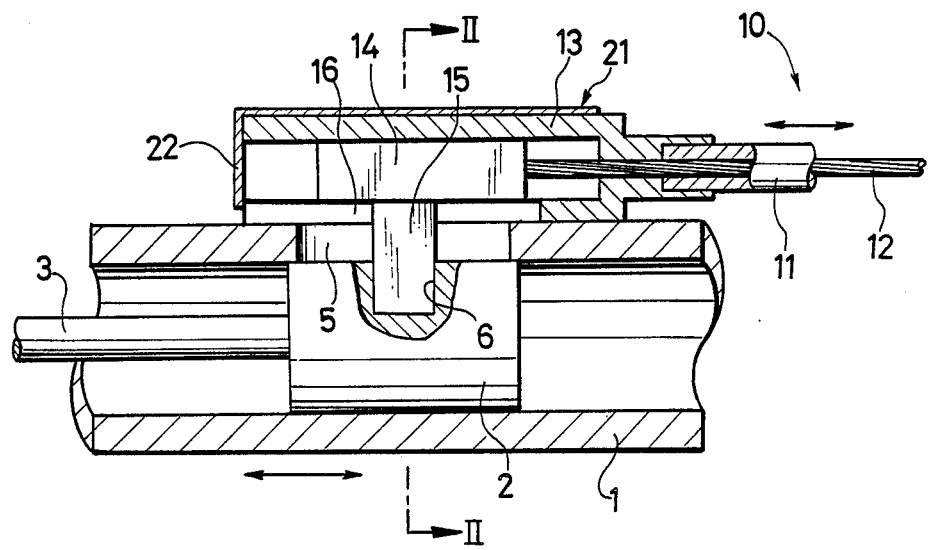
FIG. 1 is a longitudinal sectional view of a control cable connecting device embodying the present invention.
Figure 2:
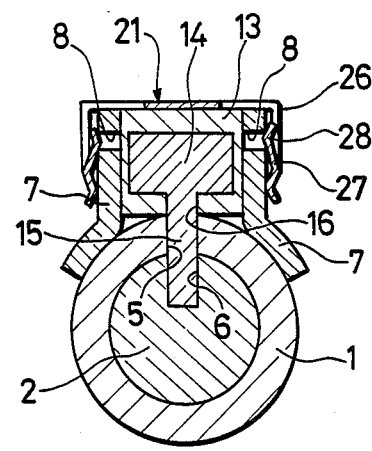
FIG. 2 is a sectional view taken on line II—II in FIG. 1.

A control cable connecting device embodying the present invention will be described with reference to FIGS. 1 to 4.

An operating member 2 is fitted slidably in a guide sleeve 1 for axial sliding movement. A spring, not shown, is connected to a rod 3 projecting from the operating member 2 to urge the operating member 2 continuously to the left as viewed in FIG. 1. A hole 6 is formed in the circumference of the operating member 2. A longitudinal slot 5 is formed in the wall of the guide sleeve 1. A pair of supporting lugs 7 are welded to the outer circumference of the guide sleeve 1 with a predetermined space therebetween. A longitudinal slot 8 is formed near the upper edge of each supporting lug 7.

Figure 3:
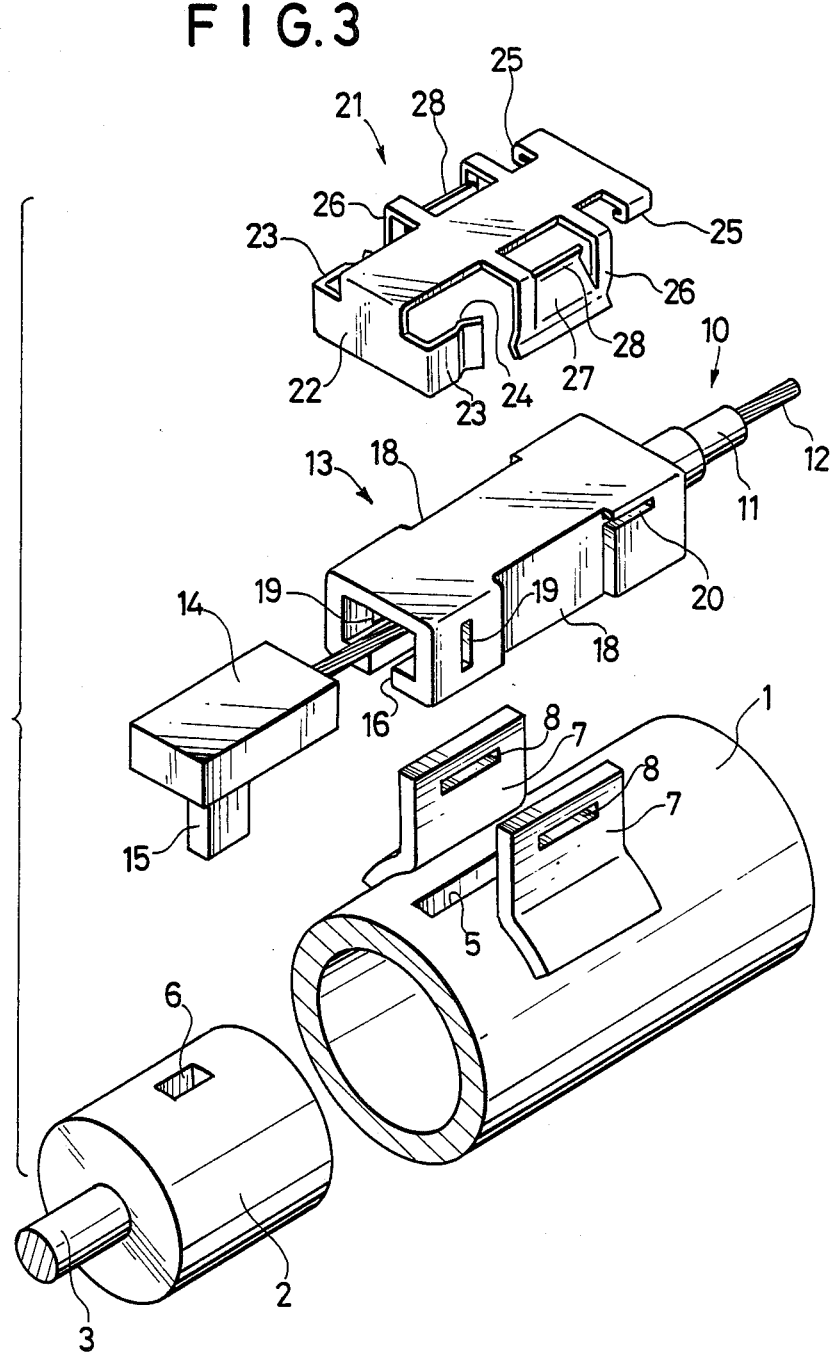
FIG. 3 is an exploded perspective view of the control cable connecting device of FIG. 1.
Figure 4:
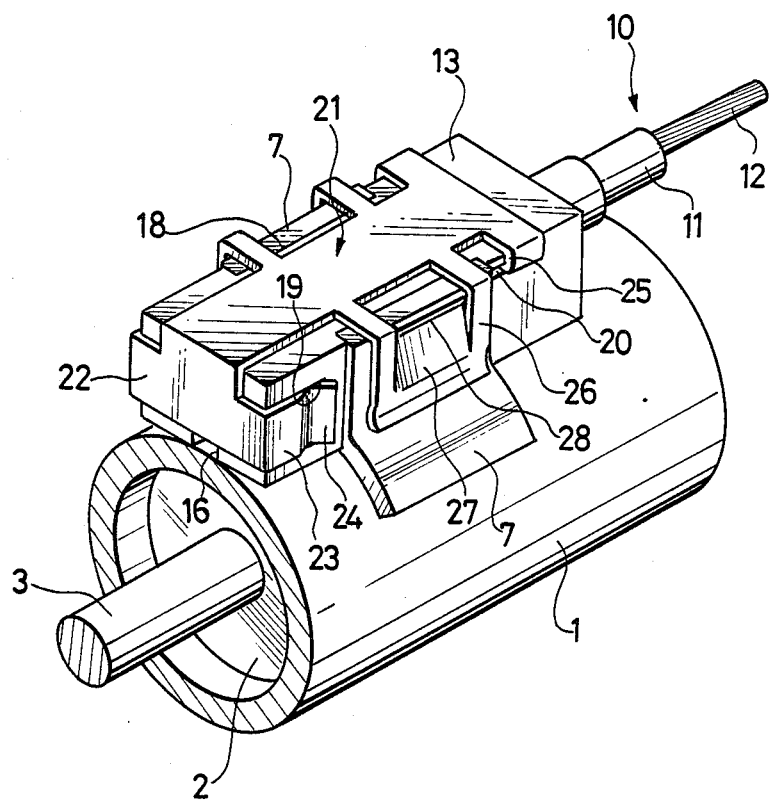
FIG. 4 is a perspective view is a perspective view of the control cable connecting device of FIG. 1 in a complete assembly.

As best shown in FIG. 3, a guide block 13 for guiding a driving member 14 having a projection 15 is provided with recesses 18 of a width corresponding to that of the supporting lugs 7 in the middle portions of the opposite side surface thereof, vertical notches 19 in the front ends (the left ends as viewed in FIG. 3) of the opposite side surfaces thereof, horizontal notches 20 in the rear ends (the right ends as viewed in FIG. 3) of the opposite side surfaces thereof, and a longitudinal slit 16 having a width corresponding to the width of the projection 15 of the driving member 14 in the bottom wall thereof. The distance between the bottom surfaces of the recesses 18 corresponds to the distance between the inner surfaces of the supporting lugs 7. The driving member 14.

A control cable 10 has a cable 12 and an outer casing 11 slidably receiving the cable 12 therein. The extremity of the outer casing 11 is fastened to the rear end (the right end as viewed in FIG. 1) of the guide block 13 by caulking the rear end of the rear end of the guide block 13. The free end of the cable 12 extending from the extremity of the outer casing 11 is connected fixedly by insert molding or caulking. The driving member 14 thus connected to the cable 12 is fitted slidably in the guide block 13 with the projection 15 thereof received in the slit 16 of the guide block 13.

A clip 21 is formed by pressing a metallic plate in a shape closely fitting the guide block 13. The opposite side ends of the front wall 22 of the clip 21 are bent backward to form side legs 23 for receiving the front end of the guide block 13 therebetween, and vertical catching ridges 24, which engage the vertical notches 19 of the guide block 13, respectively, are formed in the extremities of the side legs 23, respectively, by pressing. Horizontal catching edges 25, which engage the horizontal notches 20 of the guide block 13, respectively, are formed on the opposite sides of the rear end of the clip 21, respectively. The opposite side walls 26 of the clip 21 are punched to form tongues 27 rising from the lower edges of the side walls 26, respectively, and inclined inward, and horizontal catching ridges 28 protruding inward are formed in the upper ends of the tongues 27, respectively.

In assembling the control cable connecting device, the driving member 14 is fitted in the guide block 13 with the projection 15 received in the slit 16 of the guide block 13. Then, the guide block 13 is put on the guide sleeve 1 so that the supporting lugs 7 are received in the recesses 18 of the guide block 13, and the projection 15 of the driving member 14 is received in the hole 6 of the operating member 2. Then, the clip 21 is put on the guide block 13 so that the side legs 23 are bent elastically outward to fit to the front side surfaces of the guide block 13, and the tongues 27 are bent elastically outward to fit to the outer surfaces of the supporting lugs 7. Consequently, the vertical catching ridges 24 engage the vertical notches 19 of the guide block 13, the horizontal catching edges 25 engage the horizontal notches 20 of the guide block 13, and the horizontal catching ridges 28 engage the slots 8 of the supporting lugs 7, respectively. Thus, the guide block 13 is held firmly in place between the supporting lugs 7 by the clip 21.

When the cable 12 is pulled to the right, as viewed in FIG. 1, after assembling the control cable connecting device, the driving member 14 fixed to the cable 12 is caused to slide to the right within the guide block 13, so that the operating member 2 is caused to slide to the right within the guide sleeve 1 against the resilience of the spring. When the cable 12 is released free, the operating member 2 and the driving member 14 are cause to slide to the left by the spring.

As is apparent from the foregoing description, according to the present invention, the control cable connecting device operatively connects the driving member 14 fixed to the free end of the cable 12 of the control cable 10 to the operating member 2 simply by placing the guide block 13 fixed to the extremity of the outer casing 11 of the control cable 10 between the supporting lugs 7 fixed to the guide sleeve 1, and simply by fastening the guide block 13 to the supporting lugs 7 with the clip 21.

In a modification, the projection 15 may be formed in the operating member 2 and the hole 6 may be formed in the driving member 14 as means for connecting the operating member 2 and the driving member 14.

Although the present invention has been described as applied to operatively connecting an operating member to a pull type control cable which transmits only a pulling force to the operating member, the present invention is applicable also to operatively connecting an operating member to a push-pull type control cable which transmits both a pulling force and a pushing force.

Although the present invention has been described in its preferred form with a certain degree of particularity, obviously, many changes and variations are possible therein. It is therefore to be understood that the present invention may be practiced otherwise than specifically described herein without departing from the scope and spirit thereof.

What is claimed is:

1. A control cable connecting device comprising:
 a guide sleeve provided with a slot;
 an operating member slidably fitted within the guide sleeve and provided with a hole in the circumference thereof;
 a guide block fixedly connected to an extremity of an outer casing of a control cable having a cable sheathed in the outer casing, provided with a longitudinal slit in a bottom wall thereof, and fastened to an outer surface of the guide sleeve so that the longitudinal slit extend in parallel to an axis of the guide sleeve; and
 a driving member slidably fitted in the guide block, provided with a projection projecting through the longitudinal slit of the guide block and the slot of the guide sleeve, and engaging the hole of the operating member.

2. A control cable connecting device according to claim 1, wherein a pair of supporting lugs are fixed to the outer surface of the guide sleeve with a predetermined space therebetween, said guide block is fitted closely in the space between the supporting lugs, and the guide block is fastened to the supporting lugs with a clip.

* * * * *

UNITED STATES PATENT AND TRADEMARK OFFICE
CERTIFICATE OF CORRECTION

PATENT NO. : 4,884,468

DATED : December 5, 1989

INVENTOR(S) : Tadao MURAMATSU, et al.

It is certified that error appears in the above-identified patent and that said Letters Patent is hereby corrected as shown below:

```
On the title page:
    The entry for [30] Foreign Application Priority Data
    should appear as follows:

--Feb. 18, 1988 [JP]..................63-20334[U]--
```

Signed and Sealed this

Eleventh Day of December, 1990

Attest:

HARRY F. MANBECK, JR.

*Attesting Officer*  *Commissioner of Patents and Trademarks*